US010262495B1

(12) United States Patent
Eidam et al.

(10) Patent No.: US 10,262,495 B1
(45) Date of Patent: Apr. 16, 2019

(54) PRIZE-LINKED SAVINGS ACCOUNTS

(71) Applicant: Wells Fargo Bank, N.A., San Francisco, CA (US)

(72) Inventors: Kourtney Eidam, Marietta, GA (US); Randy Matthew Prather, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/050,328

(22) Filed: Jul. 31, 2018

Related U.S. Application Data

(63) Continuation of application No. 15/207,131, filed on Jul. 11, 2016, now Pat. No. 10,068,428.

(51) Int. Cl.
*G06F 17/00* (2019.01)
*G07F 17/32* (2006.01)

(52) U.S. Cl.
CPC ........ *G07F 17/3244* (2013.01); *G07F 17/329* (2013.01)

(58) Field of Classification Search
None
See application file for complete search history.

(56) References Cited

U.S. PATENT DOCUMENTS 5,082,275 A 1/1992 Nilssen
5,222,624 A 6/1993 Burr
7,118,476 B1 10/2006 White et al.
7,168,616 B2 1/2007 Carnation
7,407,436 B2 8/2008 Groz
8,333,653 B2 12/2012 Nyman et al.
8,419,527 B2 4/2013 Gagner et al.
8,613,652 B2 12/2013 Stanek et al.
2003/0023547 A1* 1/2003 France .................. G06Q 20/10 705/39
2004/0010447 A1 1/2004 Asayama
2004/0059659 A1 3/2004 Safaei et al.
2004/0236629 A1 11/2004 Martin
2005/0176490 A1 8/2005 Wright
2006/0019736 A1 1/2006 Amada
(Continued)

OTHER PUBLICATIONS

Brenoff, Ann, "Foreget Powerball. Consider This New Lotter-Style Savings Account," http://www.huffingtonpost.com/entry/forget-powerball-consider-this-new-lottery-style-savings-account_us_5697d43de4b0ce4964237f9c, Jan. 14, 2016, 2 pages.
(Continued)

*Primary Examiner* — Paul A D'Agostino
(74) *Attorney, Agent, or Firm* — Merchant & Gould P.C.

(57) ABSTRACT

A method implemented on a first electronic computing device includes determining available lotteries for a user of the first electronic computing device. The user is authenticated on the first electronic computing device. An area of residence is confirmed for the user. First lotteries that are available in the area of residence of the user are identified. Second lotteries for which the user can qualify are identified. The second lotteries are a subset of the first lotteries. When one or more of the second lotteries are identified, identification information for the second lotteries is sent to a second electronic computing device for display to the user on the second electronic computing device.

18 Claims, 11 Drawing Sheets

(56) References Cited

U.S. PATENT DOCUMENTS

| | | | | |
|---|---|---|---|---|
| 2008/0026810 | A1* | 1/2008 | Walker | G07F 17/32 463/17 |
| 2008/0208689 | A1 | 8/2008 | Johnson et al. | |
| 2008/0274794 | A1 | 11/2008 | Mathieson | |
| 2009/0143128 | A1 | 6/2009 | Cautley et al. | |
| 2009/0239650 | A1 | 9/2009 | Alderucci et al. | |
| 2009/0320070 | A1 | 12/2009 | Inoguchi | |
| 2010/0075732 | A1 | 3/2010 | Haley et al. | |
| 2010/0153194 | A1 | 6/2010 | Oram | |
| 2011/0105212 | A1 | 5/2011 | Fiechter | |
| 2011/0218034 | A1 | 9/2011 | Barclay et al. | |
| 2012/0129593 | A1 | 5/2012 | Englman | |
| 2012/0290950 | A1 | 11/2012 | Rapaport et al. | |
| 2013/0054314 | A1 | 2/2013 | Ross et al. | |
| 2013/0179316 | A1 | 7/2013 | Ross | |
| 2013/0191194 | A1 | 7/2013 | Shreibati et al. | |
| 2014/0164225 | A1 | 6/2014 | Cardona | |

OTHER PUBLICATIONS

Kearney, Melissa Schettini et al., "Making Savers Winners: An Overview of Prize-Linked Savings Products," Working Paper 16433, http://www.nber.org/papers/w16433, National Bureau of Economic Research, Oct. 2010, 34 pages.

Rivest, Ronald L., "Electronic Lottery Tickets as Micropayments," Financial Cryptography First International Conference, FC '97, Proceedings, 1997, 8 pages.

Guillén, Mauro F., et al., "Banking on Gambling: Banks and Lottery-Linked Deposit Accounts," Journal of Financial Services Research, vol. 3, Issue 3, 2002, 13 pages.

Patton, Carol, "Hitting the Jackpot," http://independentbanker.org/2015/10/hitting-the-jackpot/, Oct. 29, 2015, 2 pages.

Ellis, Blake, "Savings account lotteries: Win up to $25,000," http://money.cnn.com/2014/01/14/pf/lottery-savings-accounts/, Jan. 14, 2014, 4 pages.

* cited by examiner

FIG. 8
Current Interest Saved
$1.18
602
604
620
$25 lottery, 3 months, 100 entrants
$25 lottery, 3 months, 50 entrants
$50 lottery, 6 months, 20 entrants
666
668
670
660

PRIZE-LINKED SAVINGS ACCOUNTS

BACKGROUND

Pooled interest savings accounts, otherwise known as prize-linked savings accounts (PLSAs), are one way in which financial organizations can encourage their customers to save money. Interest earned on deposits from a plurality of customers can be combined and entered into a lottery in which a customer can win cash or other rewards. The possibility of winning such a lottery can encourage customers to save more so that they can accumulate interest needed to enter the lottery.

Regulations regarding lotteries vary throughout the United States. Some states permit cash lotteries; whereas, other states prohibit such lotteries. In addition, for states that permit cash lotteries, rules and regulations can vary from state to state.

SUMMARY

Embodiments of the disclosure are directed to a method implemented on a first electronic computing device for determining available lotteries for a user of the first electronic computing device, the method comprising: authenticating the user on the first electronic computing device; confirming an area of residence for the user; identifying first lotteries that are available in the area of residence of the user; identifying second lotteries for which the user can qualify, the second lotteries being a subset of the first lotteries; and when one or more of the second lotteries are identified, sending identification information for the second lotteries to a second electronic computing device for display to the user on the second electronic computing device.

In another aspect, a method implemented on a first electronic computing device for determining available lotteries for a user of the first electronic computing device comprises: authenticating the user on the first electronic computing device; confirming a state of residence for the user; identifying first lotteries that are available in the state of residence of the user; identifying rules and regulations for the first lotteries for the state of residence of the user; identifying one or more additional states having similar rules and regulations for the first lotteries; receiving first information regarding entrants to one or more of the first lotteries from the one or more additional states; receiving second information regarding bank interest submitted by the entrants of the first lotteries to enter the first lotteries; identifying second lotteries for which the user can qualify, the second lotteries being a subset of the first lotteries; and when one or more of the second lotteries are identified, sending identification information for the second lotteries to a second electronic computing device for display to the user on the second electronic computing device.

In yet another aspect, a first electronic computing device comprises: a processing unit; and system memory, the system memory including instructions which, when executed by the processing unit, cause the first electronic computing device to: authenticate a user on the first electronic computing device; confirm a state of residence for the user; identify first lotteries that are available in the state of residence of the user; determine an amount of accumulated interest in one or more financial accounts for the user at a financial institution; identify whether the amount of accumulated interest is sufficient to qualify for entering each of the first lotteries; for each of the first lotteries for which the amount of accumulated interest is sufficient to qualify for entering a first lottery, designate each first lottery as a second lottery; identify a required number of entrants for each of the second lotteries; identify a required amount of interest to enter each of the second lotteries; send information regarding the second lotteries to a second electronic computing device, the information including the required number of entrants and the required amount of interest to enter each of the second lotteries; receive a selection of one of the second lotteries from the second electronic computing device; and deduct an amount of interest required to enter the one of the second lotteries from one of the one or more financial accounts for the user.

The details of one or more techniques are set forth in the accompanying drawings and the description below. Other features, objects, and advantages of these techniques will be apparent from the description, drawings, and claims.

DETAILED DESCRIPTION

Figure 1:
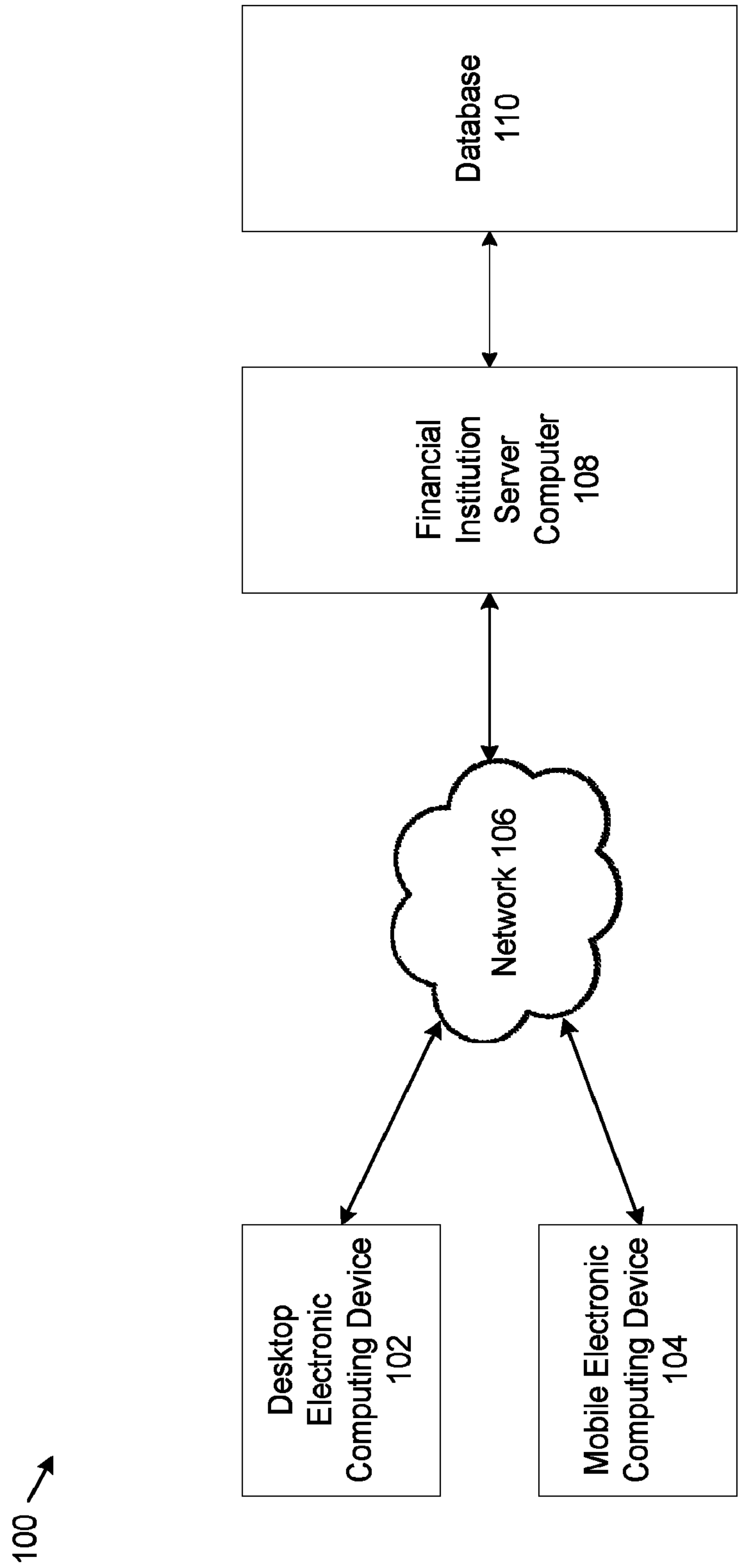
FIG. 1 shows an example system that supports prize-linked savings accounts.

The present disclosure is directed to systems and methods that can automatically identify prize-linked lotteries that a customer of a financial organization is eligible to enter, permit the customer to enter a prize-linked lottery and/or provide a notification to the customer if the customer wins a prize-linked lottery. The systems and methods can automatically identify prize-linked lotteries that the customer can qualify for based on the state in the United States in which the customer resides. In addition, prize-linked lotteries for states having similar lottery regulations can be combined to provide a higher lottery payout for customers.

As used in this disclosure, a prize-linked lottery is a lottery in which customers of a financial organization can use interest from financial accounts at the financial organization to enter the lottery. As a result of pooling interest from multiple customers, the payout from the lottery can be larger than if only one customer entered the lottery. Based on the state in the United States in which the customer resides, the customer can win cash, non-cash rewards or a combination of cash and non-cash rewards. In this disclosure, the financial accounts from which interest is deposited into the prize-linked lottery are referred to as smart prize-linked savings accounts.

The financial accounts are referred to as smart prize-linked savings accounts, because, as explained herein, the systems and methods are designed to make it easy for the customer to enter an appropriate prize-linked lottery based on their state of residence and financial status. A graphical user interface can be presented to the customer from which the customer can select preferences, select savings goals and display available lotteries. The graphical user interface comprises a digital dashboard for the customer. The customer can choose to automatically opt-in and have interest that the customer has accumulated entered into one or more lottery pools. The customer can select a time period for which the interest is accumulated, for example, monthly, bi-monthly, quarterly, etc. to increase the interest amount. The customer can also choose a savings goal, such as adding to savings for 12 months or reaching a selected balance in a selected time interval (for example, saving $5,000 in a 6 month period). The customer can also choose to enter a specific amount or a specific percentage of accumulated interest. The customer can also elect to have an alert inform them when a lottery for which they qualify is available.

As stated earlier herein, rules for defining and regulating lotteries can vary from state to state in the United States. Some states do not allow any form of lotteries and other states have different levels of regulations. For example, some states that permit lotteries permit cash payouts; whereas, other states prohibit cash payouts. For states that do not permit cash payouts, non-cash awards, such as products, services, reward points, deposit badges, increased points of interest, exclusive merchandise or other prizes may be used. Additionally for states that do not permit cash payouts, customers can earn entries into contests or drawings for prizes, services or experiences.

For states that permit cash payouts and have similar rules and regulations, interest from customers for these states can be pooled together to increase the cash payout to winners. The systems and methods can track multiple lotteries in different states, present to customers a listing of lotteries that are available in the state in which the customer resides and present to customers a listing of lotteries each customer is qualified to enter. The listing of lotteries each customer is qualified to enter comprises a subset of the lotteries that are available in the state in which the customer resides. A determination of whether a customer is qualified to enter a lottery can be based on whether an amount of interest the customer has accumulated in one or more financial accounts is greater than a minimum level of interest needed to enter a lottery. Customer qualifications for entering a lottery can also be based on whether the customer has met gamification savings goals, as discussed in more detail later herein. Other customer qualifications are possible.

In addition, the systems and method can present different options for entering lotteries to customers. For example, customers who enter a larger amount or a greater percentage of interest can be entered into a lottery with fewer participants and customers who enter a smaller amount or a smaller percentage of interest can be entered into a lottery with more participants. Thus, customers who enter a larger amount or a greater percentage of interest can have a greater chance of winning.

The systems and methods permit customers across the country, regardless of their state of residency, to track progress via the digital dashboard. The systems can track individual winnings and also track state and federal tax rules. Winners can be notified if they have reached a winnings threshold, and when the winning threshold hold is reached, the winners may decide not have interest entered again until the next calendar year. In addition, the system can automatically calculate and keep track of any taxes owed by customers based on their winnings.

In an example implementation, winners can be selected by a random number generator. Each entrant can be assigned a unique number ranging from 1 to a maximum number of entrants for a lottery. At the time of the lottery, the random number generator can automatically pick a number between 1 and the maximum number of entrants for the lottery. In addition, after the random number is picked, an alert can be sent to the winning customer and lottery winnings can be automatically deposited in a financial account of the winning customer.

The systems and methods disclosed herein are directed to a computer technology that can automatically identify and present to customers of a financial organization, prize-linked lotteries for which the customers may qualify to enter. Because the customers of the financial organization may reside in different states of the United States, and because rules and regulations for prize-linked lotteries can vary from state to state, the systems and methods improves computing efficiencies by automatically presenting to the customer the prize-linked lotteries for which the customer can enter. In addition, the systems and methods can improve computer efficiencies by identifying states that have similar rules and regulations for prize-linked lotteries and pooling interest from customers in the identified states to increase potential winnings of the prize-linked lotteries and to provide customers with a greater selection of prize-linked lotteries that they can qualify to enter. Customers in states with less regulations can have more options for choosing which lotteries to enter (both/either cash payouts and non-cash rewards) than customers who reside in more regulated states.

FIG. 1 shows an example system 100 that supports smart prize-linked savings accounts. The system 100 includes a desktop electronic computing device 102, a mobile electronic computing device 104, a network 106, a financial institution server computer 108 and a database 110. More, fewer or different components can be used.

The example desktop electronic computing device 102 is a desktop or laptop electronic computing device at a customer's home or business. The desktop electronic computing device 102 can permit a connection to the financial institution server computer 108 via network 106. From a user interface rendered on desktop electronic computing device 102, the customer can select lottery preferences, select savings goals and display available lotteries.

The example mobile electronic computing device 104 is a smartphone or tablet computer of the customer. The mobile electronic computing device 104 can include a financial software application that can permit a connection to financial institution server computer 108 via network 106. The customer can select lottery preferences, select savings goals and display available lotteries via the software application.

The example network 106 is a computer network, such as the Internet. Desktop electronic computing device 102 and mobile electronic computing device 104 can connect to or otherwise access financial institution server computer 108 via network 106.

The example financial institution server computer 108 is a server computer of a financial institution such as a bank. The financial institution server computer 108 can service one more financial account for customers of the financial institution who may reside in a plurality of states in the United States and can have access to rules and regulations for lotteries in the plurality of states. More than one financial institution server computer 108 can be used. These financial institution server computers can be located in a plurality of states of the United States.

The example database 110 is a computer database that can store financial records for customers serviced by the financial institution server computer 108 and can store rules and regulations for lotteries in the states of the United States of the customers serviced by financial institution server computer 108.

Figure 2:
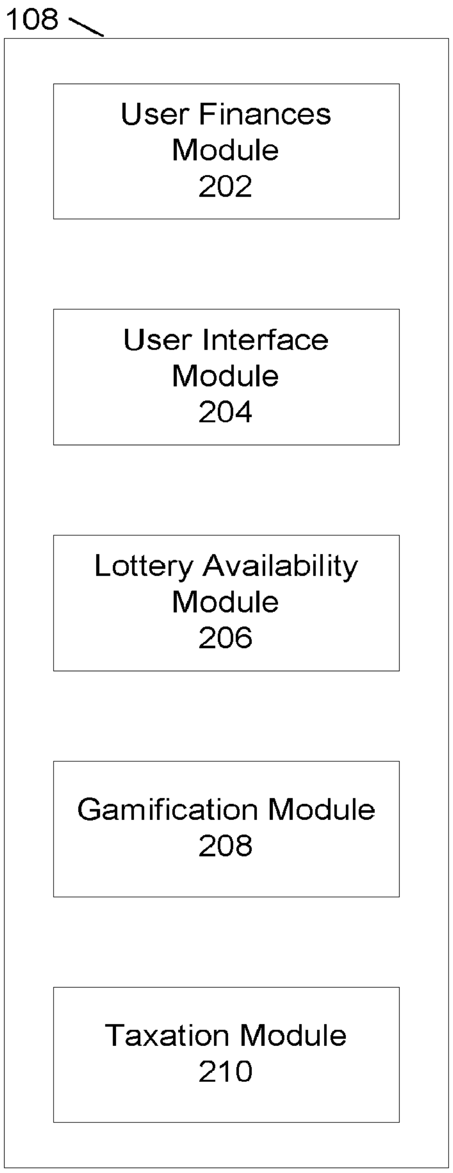
FIG. 2 shows example modules of the financial institution server computer of FIG. 1.

FIG. 2 shows example modules of financial institution server computer 108. The example modules include a user finances module 202, a user interface module 204, a lottery availability module 206, a gamification module 208 and a taxation module 210. More, fewer or different modules can be used.

The example user finances module 202 stores and services financial accounts for customers of the financial institution. The customers can be located in a plurality of states. The user finances module 202 can include a profile of each customer. The profile can include name and address information, financial account information and lottery preference information. As discussed in more detail later herein, the lottery preference information can include user preferences regarding savings goals, frequency of savings and how lottery winnings are to be distributed.

The example user interface module 204 provides a graphical user interface for the customer at the desktop electronic computing device 102 and the mobile electronic computing device 104. As discussed in more detail later herein, the user interface permits the customer to select lottery preferences, select savings goals, and display a list of lotteries for which the user can quality. The user interface can be rendered by when the customer logs into financial institution server computer 108 from desktop electronic computing device 102 or from an application on mobile electronic computing device 104.

The example lottery availability module 206 determines lotteries that are available for the customer to enter. The lotteries are determined based on the state in which the customer resides, the selected customer preferences and savings goals and an amount of interest that the customer has accumulated in one or more financial accounts at the financial institution. As discussed earlier herein, some states in the United States permit lotteries and other states prohibit lotteries. In addition, for the states that do permit lotteries, rules and regulations for the lotteries can vary from state to state. As stated earlier herein, some states permit cash payouts and other states only permit non-cash payouts, such as gifts, reward points and increased points of interest. The lottery availability module 206 automatically determines which lotteries are available to the customer and also determines whether interest from customers who reside in states that have similar rules and regulations to the lottery for the state in which the customer resides can be pooled with interest from the customer to increase a payout for the lottery.

The example gamification module 208 permits the customer to select various gaming alternatives for customers who elect a gaming option. As discussed earlier herein, a customer who resides in a state where cash payouts are permitted can choose to opt out of a gaming option and simply use accumulated interest to enter lotteries. Alternatively, a customer who resides in a state where cash payouts are not permitted may automatically be entered into the gaming option, depending on the state's regulations. In any case, when the gaming option is selected, the gamification module 208 can provide one or more game-type mechanisms in which the customer can earn non-cash rewards, such as extra interest or reward points, for completing savings goals, milestones or tasks. The non-cash rewards can be dependent on types of rewards that are allowed in the state in which the customer resides. In one example, the customer can receive reward points by completing a savings goal such as raising an amount of a monthly deposit into a financial account of the customer from $10 per month to $20 per month for a period of six months. Other amounts and periods can be used. In other example, the gamification module 208 can offer a monthly challenge, in which the customer can win increased interest points or reward points for completing the monthly challenge. An example monthly challenge can include doubling a current monthly deposit amount for the month of the challenge. As another example of gamification, the customer can earn a deposit badge by depositing a certain amount of money for a certain number of months. The earning of the deposit badge can be posted on social media.

The example taxation module 210 automatically calculates taxes that are required for the customer to pay if the customer is a winner in a lottery. The taxes are based on rules and regulations for taxes in the state in which the customer resides. For example, some states require that a lottery winning be included in federal income tax. Some states only require that state income tax be paid if the lottery winnings are greater than a certain amount. In an example implementation for a state that requires state income tax be paid, the taxation module 210 can monitor the customer's lottery winnings and when the customer's winning reach a certain threshold, the taxation module 210 can alert the customer that state and possible federal taxes may need to be paid. When the customer reaches the threshold, a value less than the amount of winnings that would trigger payment of state and/or federal taxes, the customer can elect to pause and to defer lottery entries to the next calendar year.

Figure 3:
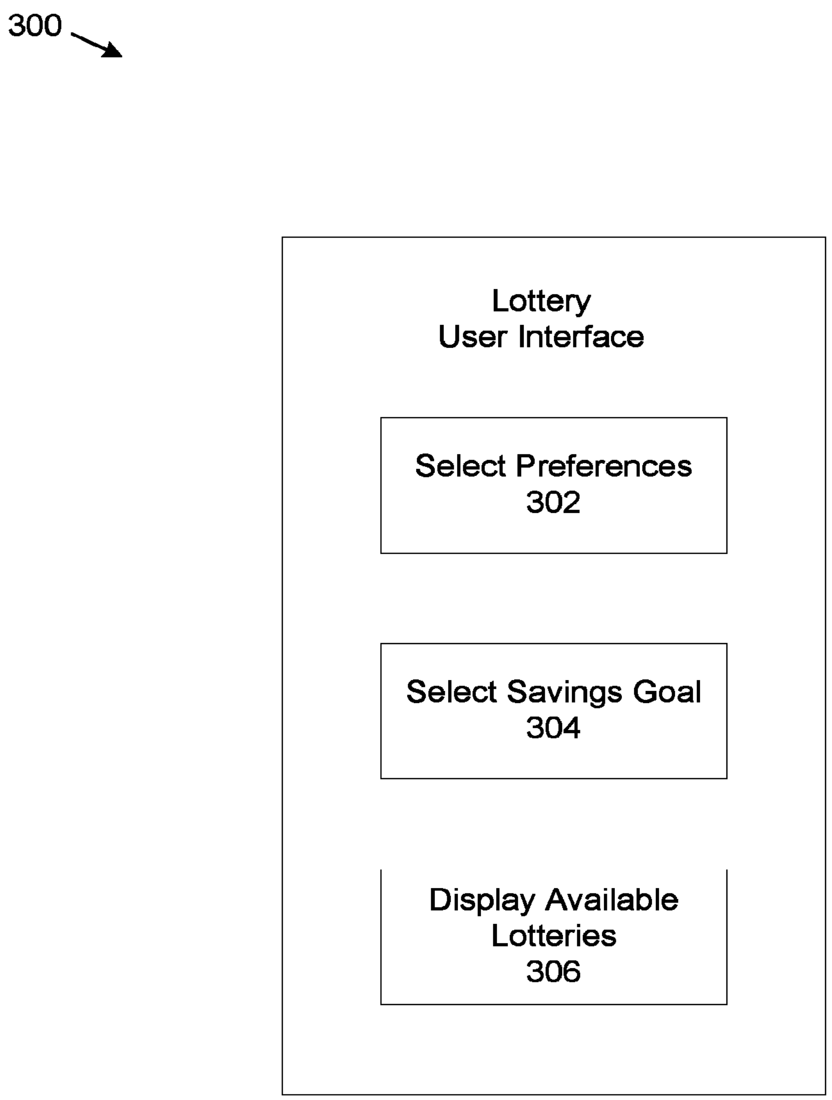
FIG. 3 shows an example user interface that can be rendered on the electronic computing devices of FIG. 1.

FIG. 3 shows an example user interface 300 for a financial software application that can be rendered on desktop electronic computing device 102 or mobile electronic computing device 104. The example user interface 300 includes options for select preferences 302, select savings goal 304 and display available lotteries 306. For the user interface 300 the options are in the form of user interface buttons that the customer can select. More, fewer, or different options are possible.

Figure 4:
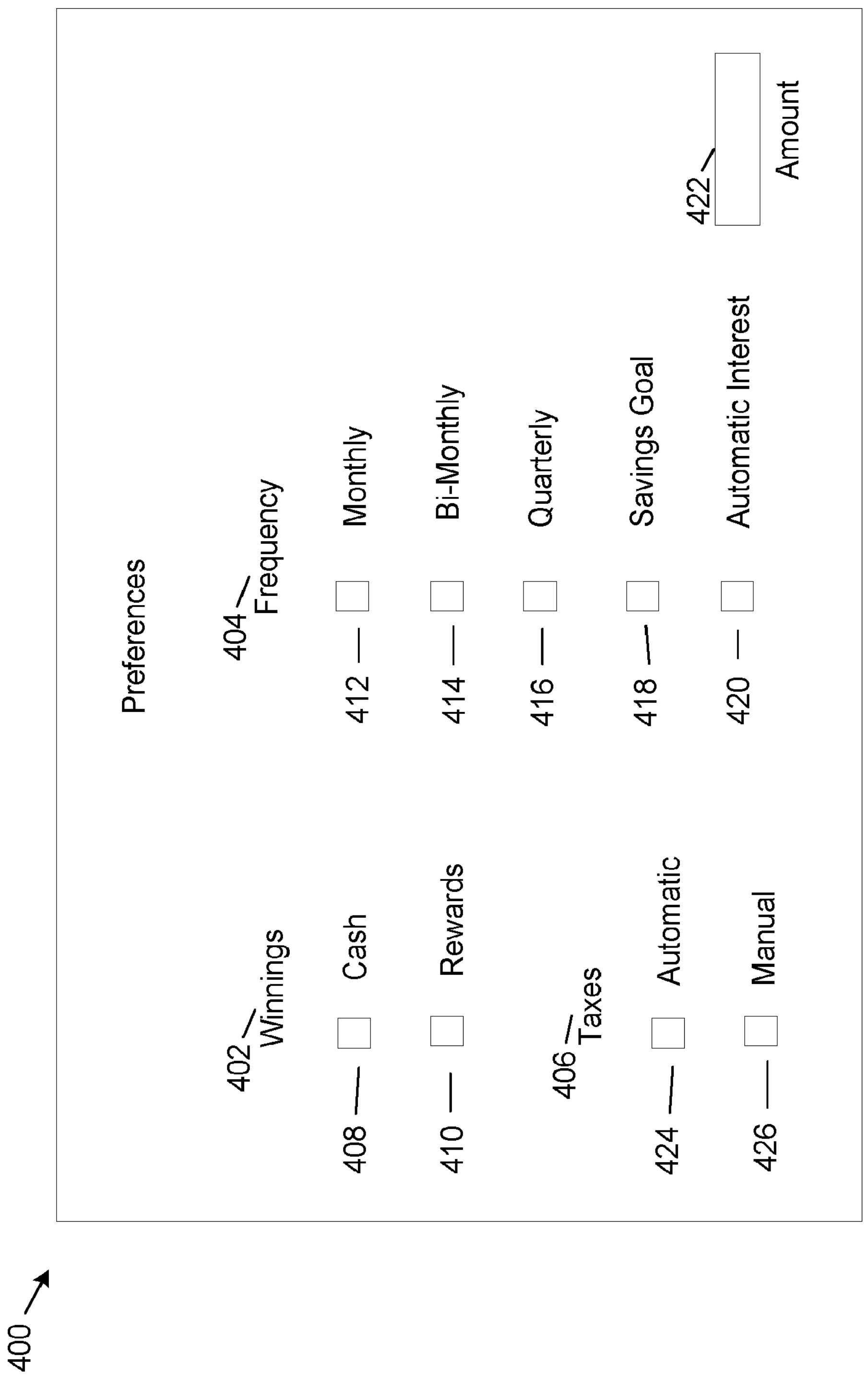
FIG. 4 shows another example user interface that can be rendered on the electronic computing devices of FIG. 1.

FIG. 4 shows an example user interface 400 that is rendered on desktop electronic computing device 102 or mobile electronic computing device 104 when the select preferences 302 option is selected. The select preferences option permits the customer to make preference selections regarding winnings 402, frequency 404 and taxes 406.

Regarding winnings 402, the customer can select whether to receive winnings in cash 408 or rewards 410. The customer can activate a checkbox for cash 408 or rewards 410 to make a selection. One or both of cash 408 or rewards 410 can be checked. The checkbox for cash 408 will only be enabled if the rules and regulations in the state in which the customer resides permits cash payouts for lotteries. When cash payouts are not permitted, the checkbox for cash 408 is disabled or not present and the customer will be unable to select cash.

Regarding frequency 404, the customer can select whether to participate in a lottery on a monthly, bi-monthly or quarterly basis, whether to participate in the lottery based on a savings goal and whether to have interest automatically entered into the lottery. Checkboxes are provided for monthly 412, bi-monthly 414, quarterly 416, savings goal

418 and automatic interest 420. When the customer selects monthly 412, interest earned by the customer for a current month is automatically entered into a lottery. When the customer selects bi-monthly 414, interest earned by the customer for a current month plus interest earned by the customer for a previous month is automatically entered into the lottery. When the customer selects quarterly 416, interest earned by the customer in a three-month period is automatically entered into the lottery. When the customer selects savings goal 418, interest accumulated by a savings goal of the customer is entered into the lottery. The use of a savings goal is explained in more detail later herein. When the customer selects automatic interest 420, an amount of interest is automatically entered into a basic lottery at monthly, bi-monthly or quarterly intervals, as determined by a selection of the monthly 412, bi-monthly 414 or quarterly 416 time intervals. The amount of interest to be automatically entered is obtained from a customer entry in an amount 422 edit box.

Regarding taxes 406, the customer can select an automatic or manual preference for taxation. Selection of automatic taxation automatically causes customer entries into a lottery to be put on hold until the next calendar year when customer winnings reach a threshold. The threshold is a monetary amount that is less than an amount that would cause either a state tax or federal tax liability based on the rules and regulations for the state in which the customer resides. Selection of manual taxation permits the customer to decide how to handle a possible taxation event. When the customer receives an alert that the winnings of the customer for the calendar year have reached the threshold, the customer can decide whether to put entries on hold or whether to continue to enter lotteries for the current calendar year. The customer can select to automatically hold lottery entries by checking the automatic 424 checkbox and the customer can manually decide whether to hold lottery entries by checking the manual 426 checkbox.

Figure 5:
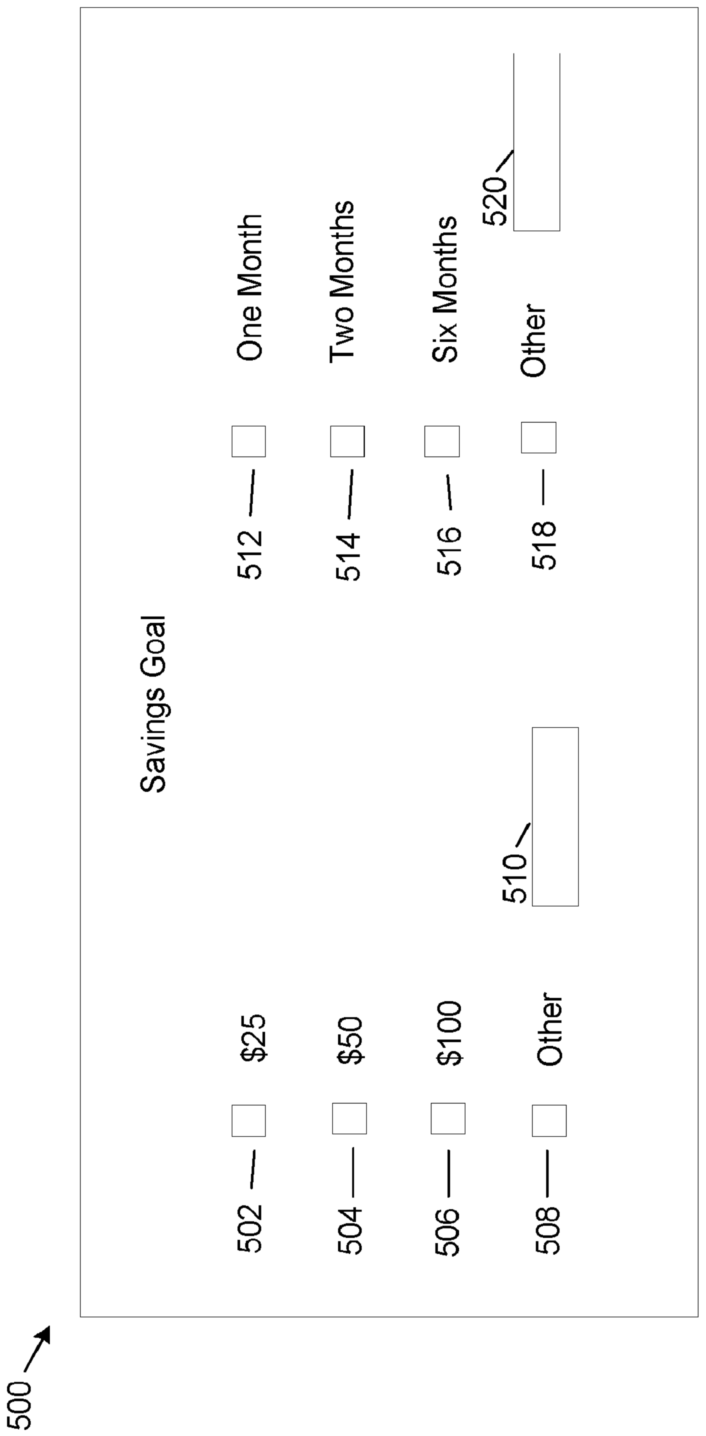
FIG. 5 shows yet another example user interface that can be rendered on the electronic computing devices of FIG. 1.

FIG. 5 shows an example user interface 500 that is rendered on desktop electronic computing device 102 or mobile electronic computing device 104 when the select savings goal 304 option is selected. The select savings goal permits the customer to select an amount of money to save for each month of a selected time interval as part of a gamification savings option available to the customer. The example user interface 500 includes checkboxes 502, 504, 506 and 510 for selecting savings options of $25, $50, $100 and other, respectively. When a savings goal of other is selected, the customer can enter an amount to save into edit checkbox 510. The user interface 500 also includes checkboxes 512, 514, 516 and 518 for time interval options of one month, two months, six months and other, respectively. When a time interval of other is selected, the customer can enter a time interval for savings into edit box 520.

The selection of a savings goal and time interval via the user interface 500 permits the user to qualify for certain lotteries based on savings goals, as discussed in more detail later herein. For states that permit cash payouts, selection of a higher savings goal for a longer time interval can result in a higher cash payout for the customer. For states that do not permit cash payouts, selection of a higher savings goal for a longer time interval can result in a higher level of non-cash rewards.

Figure 6:
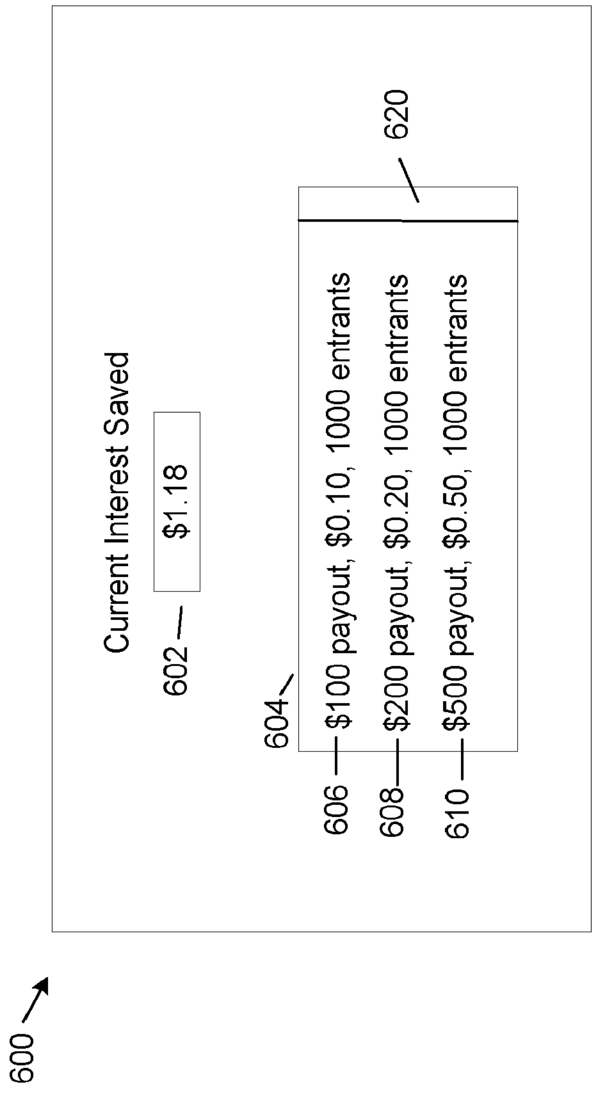
FIG. 6 shows yet another example user interface that can be rendered on the electronic computing devices of FIG. 1.

FIG. 6 shows an example user interface 600 that is rendered on desktop electronic computing device 102 or mobile electronic computing device 104 when the display available lotteries 306 option is selected. The example user interface 600 includes a text box 602 that displays a current amount of interest saved for the customer. For this example, the customer has accumulated a total of $1.18 of interest. The user interface 600 also includes a list box 604 that displays summary details of lotteries that are currently available to the customer based on selected user preferences and savings goals. The list box includes a scroll bar 620 to display additional available lotteries for the customer.

In some implementations, the customer can sign up to be notified by alerts when the customer qualifies for one or more lotteries. The customer can access user interface 600 (via selecting the display available lotteries 306 option) when the customer receives such an alert. In other implementations, the customer can select the display available lotteries 306 option at any time, when the customer wants to manually select a lottery to enter.

FIG. 6 shows example lottery display summaries 606, 608 and 610. Additional lottery display summaries can be displayed via scroll bar 620. As an example, lottery display summary 606 shows an available lottery that offers a $100 payout, requires an entry of $0.10 of interest and has a pool of 1000 entrants. Lottery display summary 608 shows an available lottery that offers a $200 payout and also has a pool of 1000 entrants, but requires an entry of $0.20 of interest. Lottery display summary 610 shows an available lottery that offers a $500 payout and also has a pool of 1000 entrants, but requires an entry of $0.50 of interest.

As shown for lottery display summaries 606, 608 and 610, the cash payouts for these example lotteries is equal to the required interest entry fee multiplied by the number of the pool of entrants in the lotteries. Thus, the customer can select one of these lotteries based on the cash payout and the amount of interest required to enter. The chance of winning is the same for each of these lotteries because the number of entrants is the same for each of these lotteries.

Figure 7:
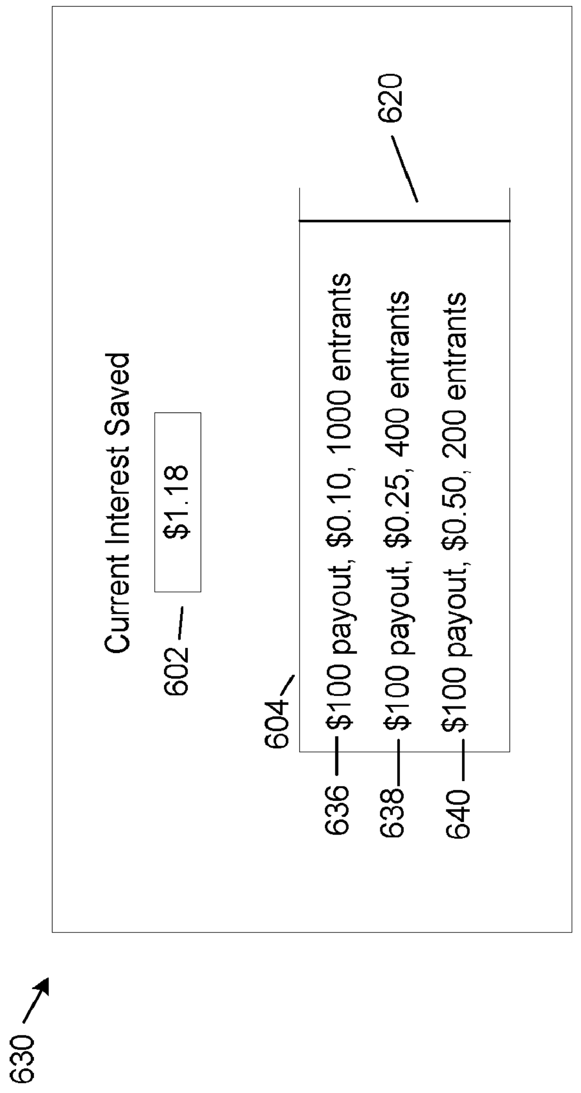
FIG. 7 shows yet another example user interface that can be rendered on the electronic computing devices of FIG. 1.

FIG. 7 shows an example user interface 630 that is rendered on desktop electronic computing device 102 or mobile electronic computing device 104 when the display available lotteries 306 option is selected. The example user interface 630 includes the text box 602 that displays the current amount of interest saved for the customer. For this example, the customer has accumulated a total of $1.18 of interest. The user interface 630 also includes the list box 604 that displays summary details of additional lotteries that are currently available to the customer based on selected user preferences and savings goals. The list box 604 includes the scroll bar 620 to display additional available lotteries for the customer.

FIG. 7 shows example lottery display summaries 636, 638 and 640. Additional lottery display summaries can be displayed via scroll bar 620. As an example, lottery display summary 636 shows an available lottery that offers a $100 payout, requires an entry of $0.10 of interest and has a pool of 1000 entrants. Lottery display summary 638 shows an available lottery that also offers a $100 payout, but requires an entry of $0.25 of interest and has a pool of 400 entrants. Lottery display summary 640 shows an available lottery that also offers a $100 payout, but requires an entry of $0.50 of interest and has a pool of 200 entrants. These three lotteries offer the same $100 payout, but offer a better chance to win for a higher entry amount. Thus, the lottery corresponding to lottery display summary 636 offers a one in 1000 chance to win for an entry amount of $0.10, the lottery corresponding to lottery display summary 638 offers a one in 400 chance to win for a higher entry amount of $0.25 and the lottery corresponding to lottery display summary 640 offers a one in 200 change to win for a still higher entry amount of $0.50.

Figure 8:
FIG. 8 shows yet another example user interface that can be rendered on the electronic computing devices of FIG. 1.

FIG. 8 shows an example user interface 660 that is rendered on desktop electronic computing device 102 or mobile electronic computing device 104 when the display available lotteries 306 option is selected. The example user interface 660 includes the text box 602 that displays the current amount of interest saved for the customer. For this example, the customer has accumulated a total of $1.18 of interest. The user interface 660 also includes the list box 604 that displays summary details of additional lotteries that are currently available to the customer based on selected user preferences and savings goals. The list box 604 includes the scroll bar 620 to display additional available lotteries for the customer.

FIG. 8 shows example lottery display summaries 666, 668 and 670. Additional lottery display summaries can be displayed via scroll bar 620. Example lottery display summaries 666, 668 and 670 show available lotteries based on savings goals. For example, lottery display summary 666 shows an available $25 lottery based on saving $25 a month for three months and a pool of 100 entrants, lottery display summary 668 shows an available $25 lottery based on saving $25 a month for three months with a pool of 50 entrants and lottery display summary 670 shows an available $50 lottery based on saving $50 a month for six months with a pool of 20 entrants. For each of these savings goals lotteries, an amount of interest accumulated by each of the participants, based on the selected dollar amount and time interval, are entered into the lottery pool. The winner of the lottery then wins the amount of the amount of interest in the pool.

Figure 9:
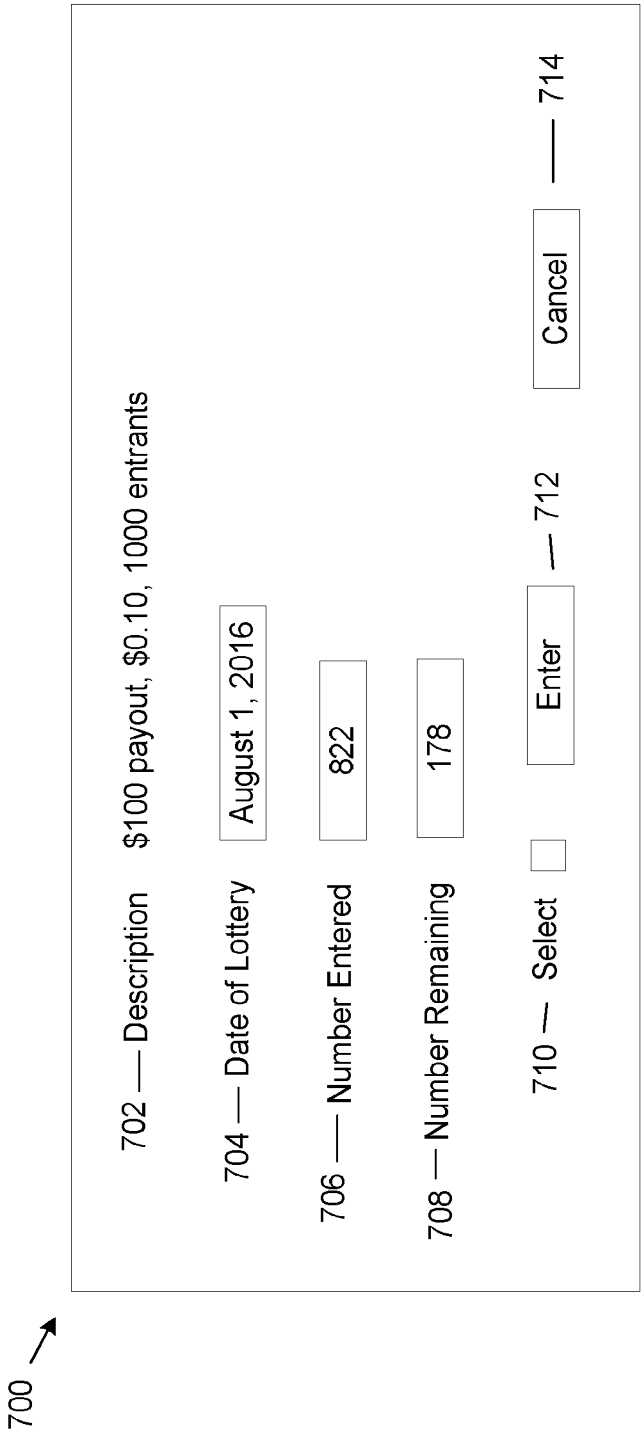
FIG. 9 shows yet another example user interface that can be rendered on the electronic computing devices of FIG. 1.

When a display summary is selected, more detailed information about the available lottery is displayed. FIG. 9 show an example user interface 700 for a detailed display summary when the available lottery corresponding to lottery display summary 606 is selected. The example user interface 700 includes the lottery display summary 702, the date of the lottery 704, the number of people currently entered into the lottery 706, the number of people that remain to enter 708 before the lottery can take place, a select checkbox 710, an enter button 712 and a cancel button 714. When the customer wants to enter the lottery, the customer can check the select checkbox 710 and then press the enter button 712. For the example of FIG. 7, when the customer clicks the enter button 712, $0.10 from the customer's accumulated interest is withdrawn from the customer's financial account and entered into the lottery. The customer can cancel by pressing the cancel button 714.

In some implementations, the lottery of FIG. 9 will not take place until the required 1000 people sign up for it. In other implementations, the lottery will take place on the date of the lottery 704 with interest from the people who have entered the lottery by the date of the lottery 704, in this case by Aug. 1, 2016. When the lottery takes place with fewer people, the cash payout is less than if the required numbers of people have entered the lottery. For the implementation where the required numbers of people have not entered the lottery by date of the lottery 704, an alert can be sent out to the people who have already entered the lottery. In an example implementation, the lottery can be delayed by a certain number of weeks, giving people more time to enter. Then, when an extended date for running the lottery is reached, the lottery can be run with the number of people entered into the lottery at the extended date.

Figure 10:
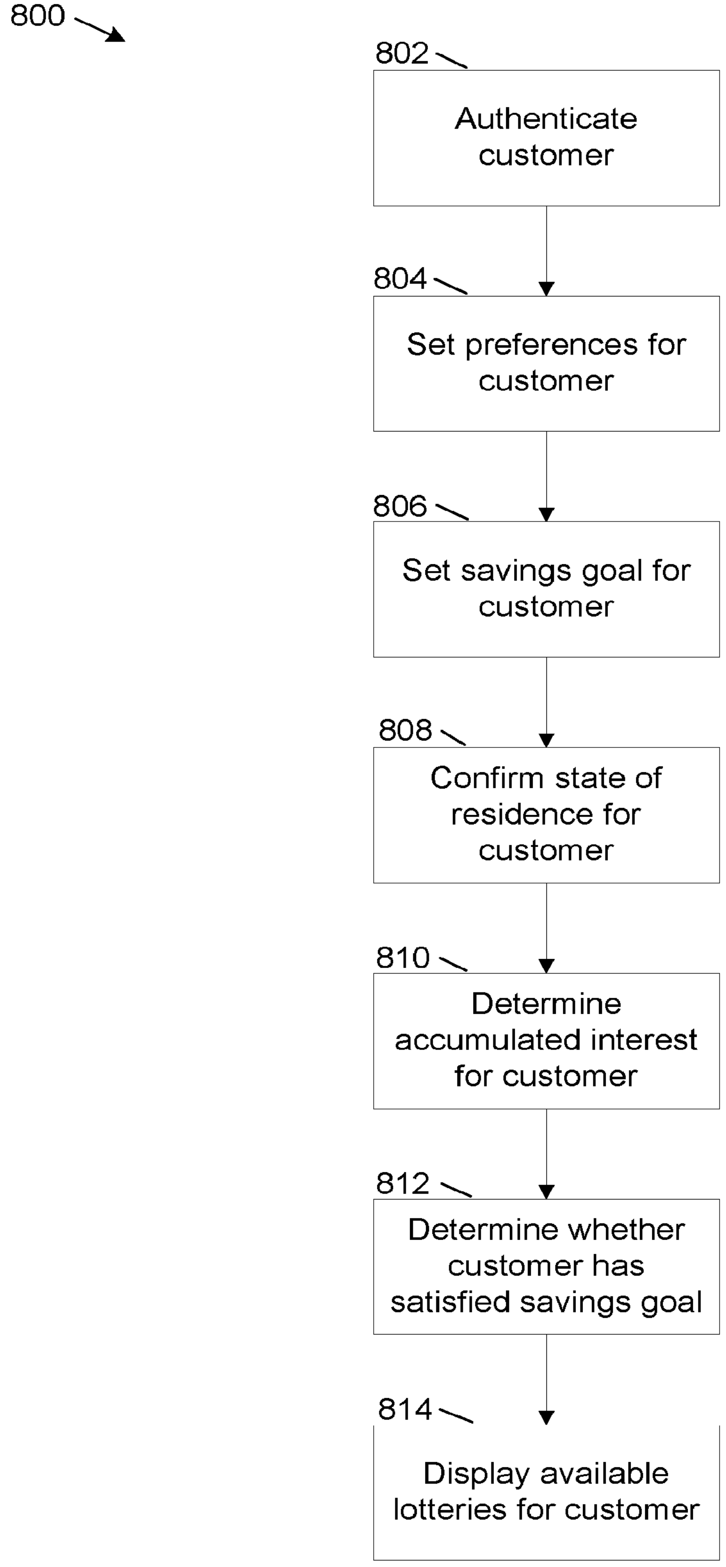
FIG. 10 shows a method for implementing a pooled interest prize-linked savings account.

FIG. 10 shows a flowchart of an example method 800 for implementing a smart pooled prize-linked savings account. The smart pooled user savings account is a savings account in which a customer of a financial organization contributes an amount of accumulated interest into a pooled customer lottery. The pooled customer lottery receives interest entries from the customer as well as from pooled customers who can be customers of the financial organization from a state of residence of the customer or from states that have similar rules and regulations for lotteries as the state of residence of the customer.

At operation 802, the customer of the financial organization is authenticated at a server computer of the financial organization, for example financial institution server computer 108. The customer can access the server computer via a desktop device, such as desktop electronic computing device 102 or a mobile device, such as mobile electronic computing device 104 across network 106.

At operation 804, lottery preferences are set for the customer. The lottery preferences can comprise selecting whether lottery winnings are to be in cash or non-cash rewards (for customers in states that permit cash rewards), whether accumulated interested is to be automatically entered into a lottery, a time interval, for example monthly, bi-monthly or quarterly, at which the accumulated interest is to be automatically entered, whether interest is to be accumulated from savings goals for the customer, a time interval at which accumulated interest from savings goals is to be entered into the lottery and other preferences.

At operation 806, savings goals are set for the customer. The savings goals can comprise selecting an amount to save each month for selected number of months. For example, amounts of $25, $50, $100 or other amounts can be saved each month for a time interval of one month, two months, six months or another time interval. Based on the lottery preferences from operation 804, accumulated interest from the amounts saved can be entered monthly, bi-monthly or quarterly into a lottery.

At operation 808, a state of the United States in which the customer resides is identified. When the customer is authenticated at the financial institution, the residence of the customer is known, because the customer has one or more accounts at the financial institution. However, some states require that the state of residence of the customer be confirmed by the customer before permitting the customer to enter a lottery in the state of residence of the customer.

At operation 810, a determination is made as to an amount of interest the customer has accumulated in one or more financial accounts of the user at the financial institution. The amount of interest can be accumulated based on normal deposits of the customer or the amount of interest can be accumulated as a result of gamification. For example, as discussed earlier herein, the customer can choose to save a selected amount of money each month for a selected number of months.

At operation 812, a determination is made as to whether the customer has satisfied a savings goal. For example, if the customer had a goal to save $50 a month for six consecutive months, a determination is made as to whether the customer has saved $300 over the six month period.

At operation 814, available lotteries are displayed to the customer at desktop electronic computing device 102 or at mobile electronic computing device 104. The available lotteries displayed are those that are available in the state of residence of the customer for which the customer has met entry requirements for the lottery. The entry requirements can include having a sufficient accumulated interest to enter the available lotteries or completing one or more savings goals.

Figure 11:
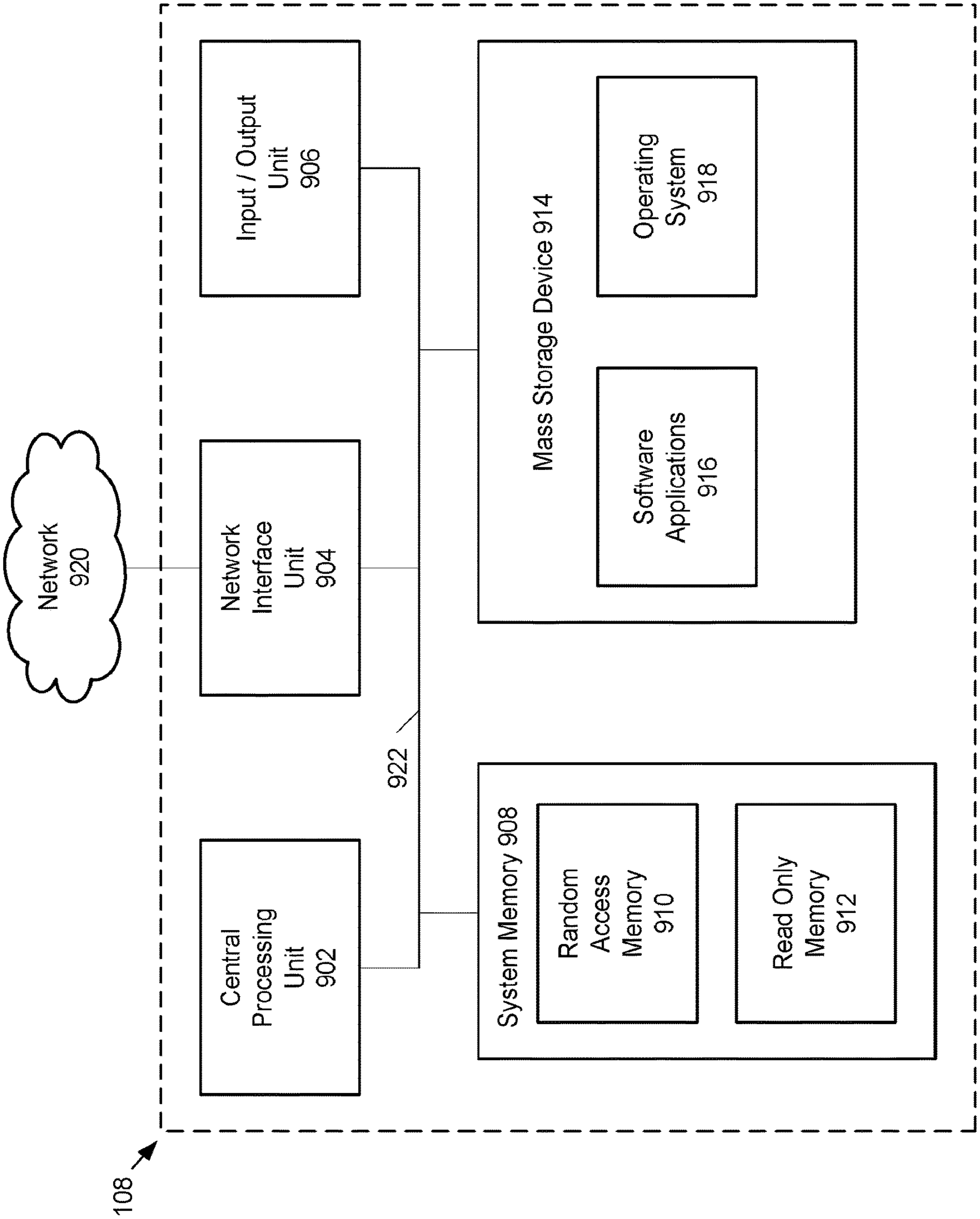
FIG. 11 shows example physical components of the electronic computing devices of FIG. 1.

As illustrated in the example of FIG. 11, financial institution server computer 108 includes at least one central processing unit ("CPU") 902, a system memory 908, and a system bus 922 that couples the system memory 908 to the CPU 902. The system memory 908 includes a random access memory ("RAM") 910 and a read-only memory ("ROM") 912. A basic input/output system that contains the basic routines that help to transfer information between elements within the financial institution server computer 108, such as during startup, is stored in the ROM 912. The financial institution server computer 108 further includes a mass storage device 914. The mass storage device 914 is able to store software instructions and data. Some or all of the components of the financial institution server computer 108 can also be included in the desktop electronic computing device 102 and the mobile electronic computing device 104.

The mass storage device 914 is connected to the CPU 902 through a mass storage controller (not shown) connected to the system bus 922. The mass storage device 914 and its associated computer-readable data storage media provide non-volatile, non-transitory storage for the financial institution server computer 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the financial institution server computer 108.

According to various embodiments of the invention, the financial institution server computer 108 may operate in a networked environment using logical connections to remote network devices through the network 920, such as a wireless network, the Internet, or another type of network. The financial institution server computer 108 may connect to the network 920 through a network interface unit 904 connected to the system bus 922. It should be appreciated that the network interface unit 904 may also be utilized to connect to other types of networks and remote computing systems. The financial institution server computer 108 also includes an input/output controller 906 for receiving and processing input from a number of other devices, including a touch user interface display screen, or another type of input device. Similarly, the input/output controller 906 may provide output to a touch user interface display screen or other type of output device.

As mentioned briefly above, the mass storage device 914 and the RAM 910 of the financial institution server computer 108 can store software instructions and data. The software instructions include an operating system 918 suitable for controlling the operation of the financial institution server computer 108. The mass storage device 914 and/or the RAM 910 also store software instructions, that when executed by the CPU 902, cause the financial institution server computer 108 to provide the functionality of the financial institution server computer 108 discussed in this document. For example, the mass storage device 914 and/or the RAM 910 can store software instructions that, when executed by the CPU 902, cause the financial institution server computer 108 to display received data on the display screen of the financial institution server computer 108.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an electronic computing device for determining available lotteries for a user, the method comprising:

accessing an area of residence for the user;

identifying lotteries that are available in the area of residence for the user for which the user can elect a gaming option, the gaming option comprising a game-type mechanism in which the user can earn non-cash rewards;

determining whether the user has satisfactorily completed the gaming option of at least one of the lotteries; and when a determination is made that the user has satisfactorily completed the gaming option of the at least one of the lotteries, providing a non-cash reward to the user, wherein satisfactorily completing the gaming option comprises completing a monthly challenge.

2. The method of claim 1, wherein the lotteries are prize-linked lotteries that comply with rules and regulations for the area of residence of the user.

3. The method of claim 1, wherein the non-cash reward comprises reward points.

4. The method of claim 1, wherein the non-cash rewards comprise increased points of interest for a financial account of the user.

5. The method of claim 1, wherein the non-cash rewards comprise entries into contests or drawings for prizes, services, or experiences.

6. The method of claim 1, wherein satisfactorily completing the gaming option comprises saving a specific amount of money at a financial institution for a specific number of months.

7. The method of claim 6, wherein satisfactorily completing the gaming option comprises raising an amount of a monthly deposit into a financial account of the user by the specific amount of money for a period of six months.

8. The method of claim 1, wherein the monthly challenge comprises doubling a current deposit amount into a financial account of the user for a current month.

9. The method of claim 1, wherein the non-cash reward is dependent on a geographic region in which the user resides.

10. The method of claim 1, further comprising:

monitoring accumulated interest for the user in one or more financial accounts of the user at a financial institution; and determining a lottery to enter based on an amount of accumulated interest within a specific time period.

11. The method of claim 10, wherein a number of participants who can enter a lottery is dependent on an amount of accumulated interest applied to the lottery for a participant, the higher the amount of accumulated interest, the fewer participants who can enter the lottery.

12. The method of claim 1, wherein further comprising, causing a digital dashboard to be rendered on the electronic computing device, the digital dashboard permitting the user to select lotteries that the user wishes to enter.

13. A method implemented on an electronic computing device for determining available lotteries for a user, the method comprising:

authenticating the user on the electronic computing device;

confirming an area of residence for the user;

identifying lotteries that are available in the area of residence of the user that provide a non-cash reward;

determining whether the user qualifies to enter one or more of the lotteries when the user saves a specific amount of money at a financial institution for a specific number of months; and when a determination is made that the user qualifies to enter one or more of the lotteries, sending identification information for the lotteries that the user qualifies to the user.

14. The method of claim 13, wherein the non-cash reward lotteries are lotteries in which the user can select a gaming option, the gaming option comprising a game-type mechanism in which the user can win the non-cash reward.

15. The method of claim 14, wherein determining that the user qualifies to enter one or more of the lotteries comprises determining whether the user has satisfactorily completed the gaming option.

16. The method of claim 13, wherein the more money the user saves in the specific number of months, the more lotteries the user can be qualified to enter.

17. The method of claim 13, wherein the non-cash reward comprises reward points or increased points of interest for a financial account of the user.

18. An electronic computing device comprising:

a processing unit; and system memory, the system memory including instructions which, when executed by the processing unit, cause the electronic computing device to:

authenticate the user on the electronic computing device;

confirm an area of residence for the user;

identify prize-linked lotteries that are available in the area of residence for the user for which the user can elect a gaming option, the prize-linked lotteries complying with rules and regulations for a geographic region in which the user resides, the gaming option comprising saving a specific amount of money at a financial institution for a specific number of months;

determine whether the user has satisfactorily completed the gaming option of one of the lotteries; and when a determination is made that the user has satisfactorily completed the gaming option of the one of the lotteries, provide a non-cash reward to the user, the non-cash reward being dependent of the geographic region in which the user resides.

* * * * *